United States Patent Office
3,189,119
Patented June 15, 1965

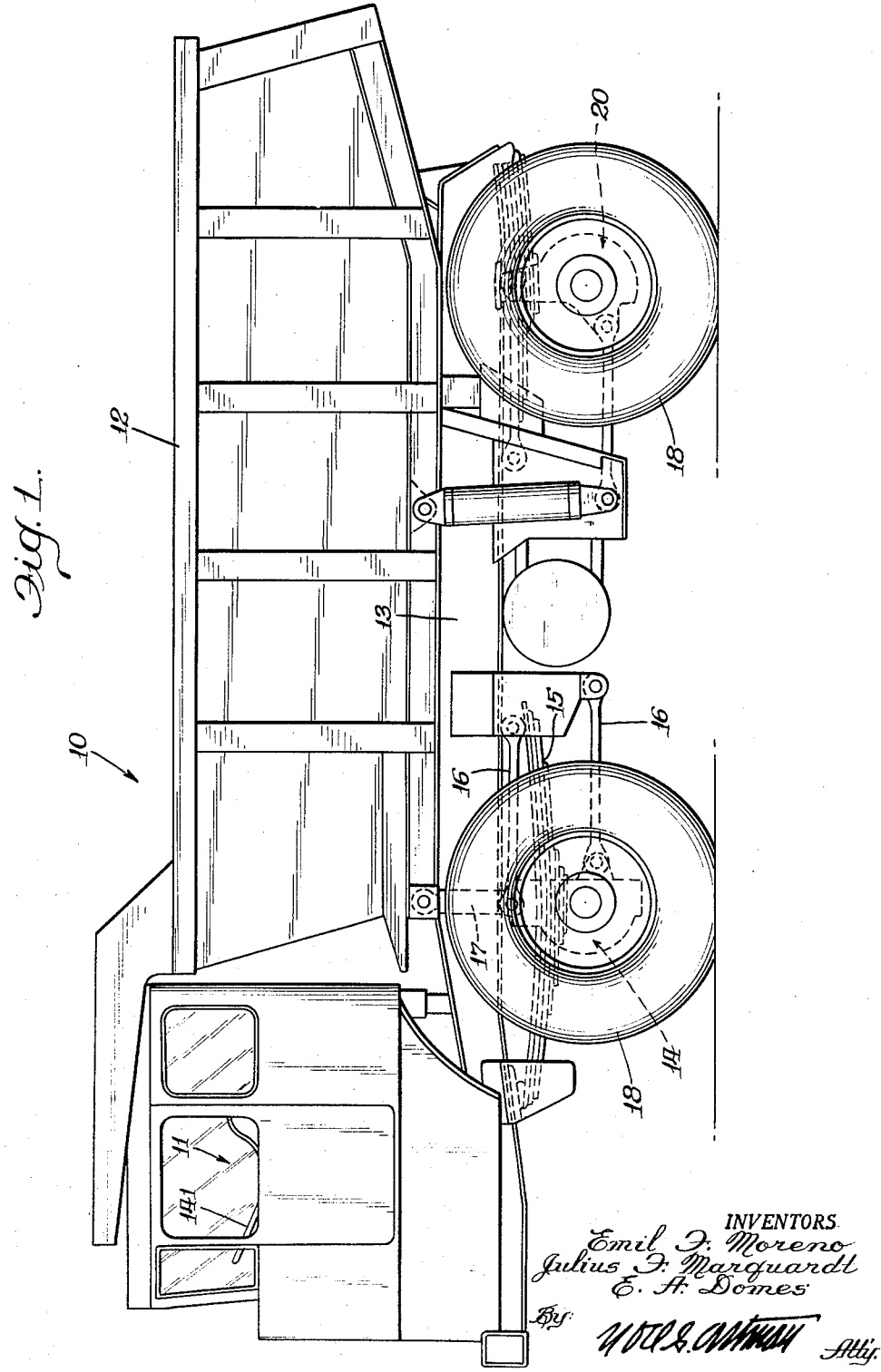

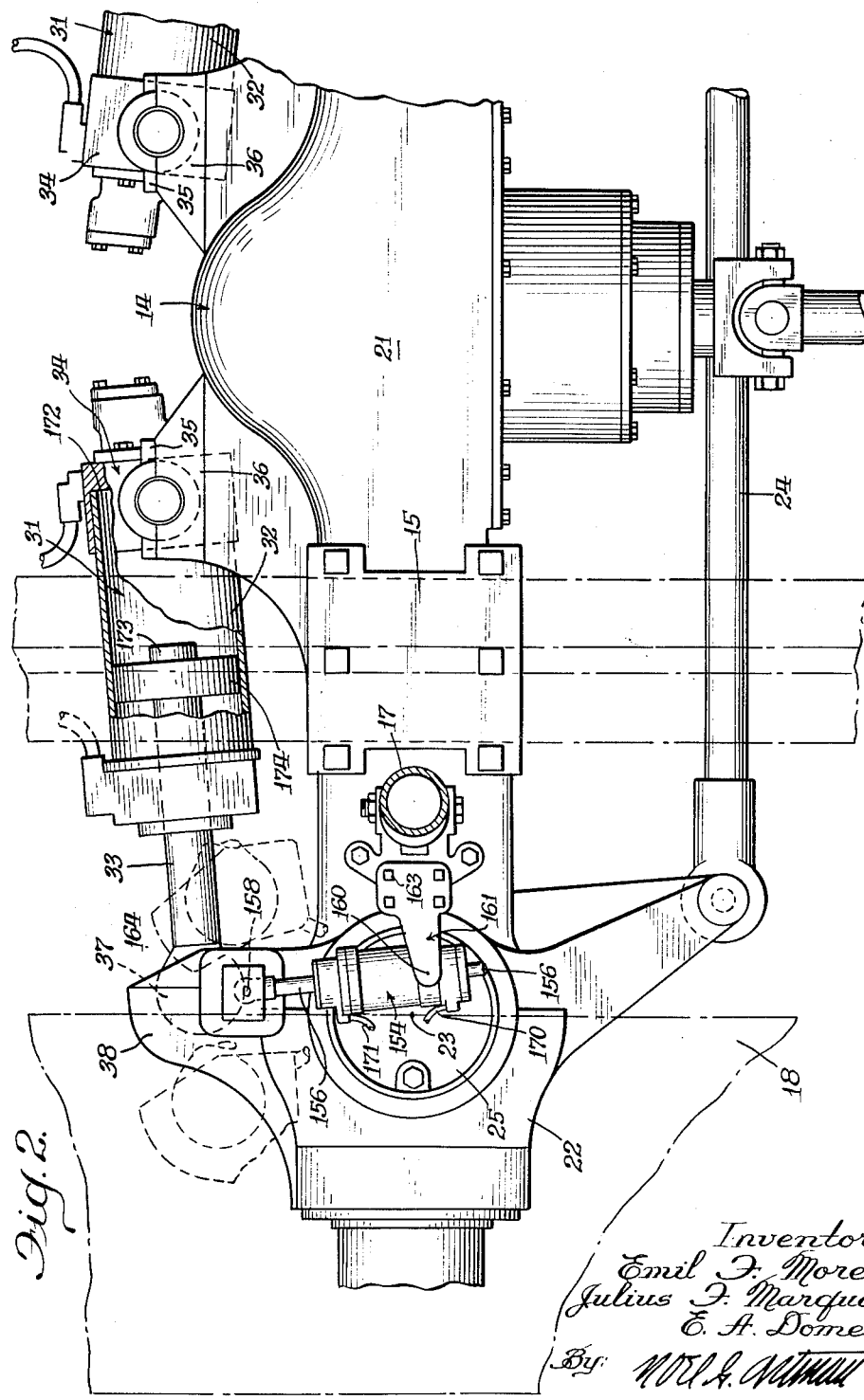

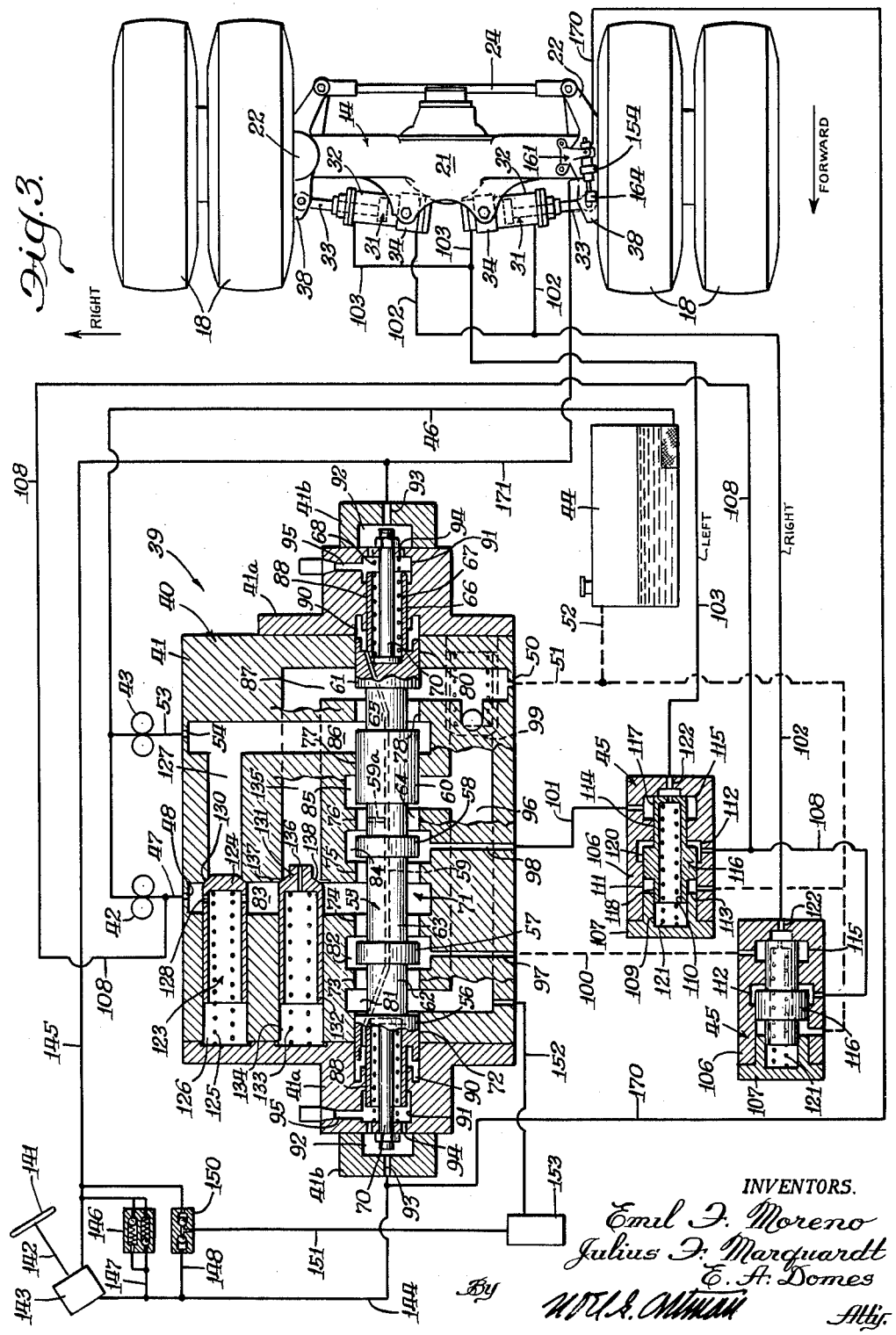

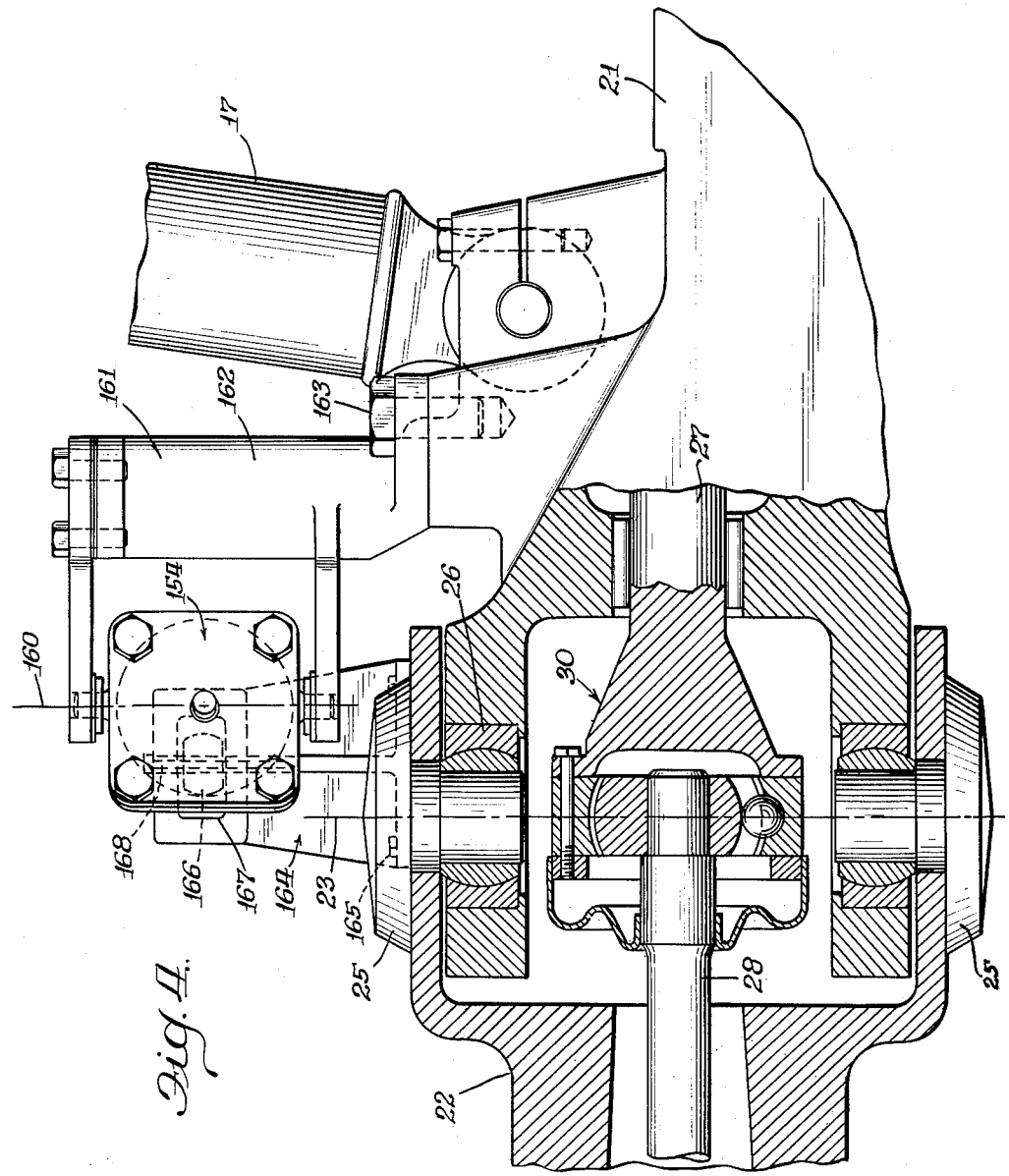

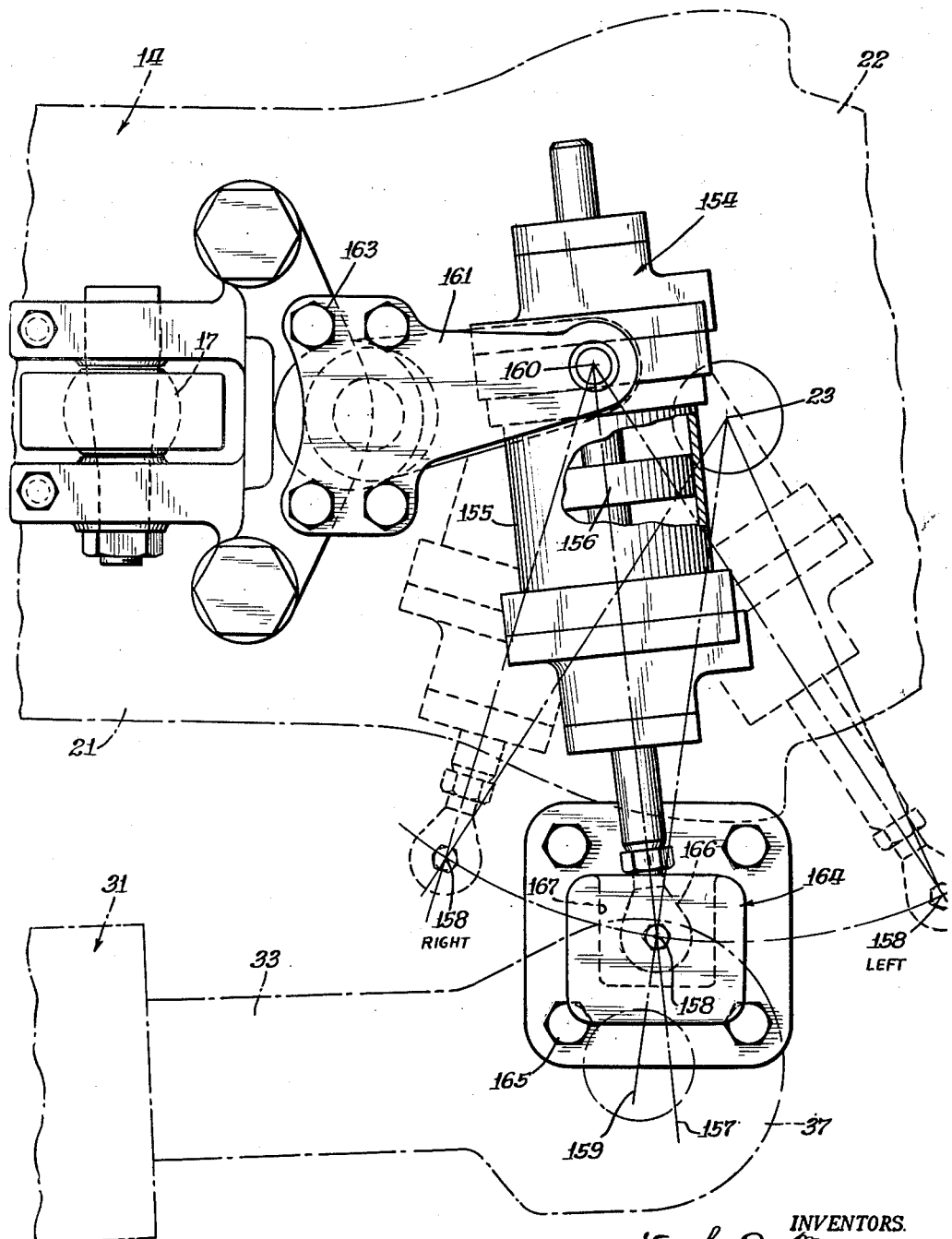

3,189,119
FLUID POWER STEERING SYSTEM
Emil F. Moreno, Melrose Park, Julius F. Marquardt, Westchester, and E. A. Domes, Wheaton, Ill., assignors to International Harvester Company, Chicago, Ill., a corporation of New Jersey
Filed Nov. 5, 1962, Ser. No. 235,312
15 Claims. (Cl. 180—79.2)

This invention relates to a fluid power steering system and more particularly this invention relates to an improved hydraulic power steering system for a two axle truck vehicle of the off-the-road type wherein one of the axles is a steerable driving axle.

An object of this invention is to provide a fluid power steering system for a truck vehicle wherein the steerable driving axle comprises two outer axle housings steeringly connected to an inner axle housing and a hydraulic circuit including a control circuit and a working circuit operatively connected to the steerable driving axle for steering movement thereof.

An object of this invention is to provide an improved hydraulic steering system for a powered vehicle wherein the actuators for power steering the steerable driving axle further function to limit the degree of steering movement.

Another object of this invention is to provide an improved hydraulic steering system for a powered vehicle wherein pressure responsive means are interposed in the hydraulic circuit to maintain a selected steering direction and to prevent steering movement unless at a predetermined pressure.

Still another object of this invention is to provide an improved fluid power steering system for a powered vehicle wherein the follow-up mechanism provides equal displacement of telemetric pressure fluid even though opposite steering movements of the steerable driving axles are unequal.

Further another object of this invention is to provide an improved hydraulic steering system wherein the hydraulic circuit provides another pressure responsive means to maintain a predetermined pressure in the control circuit of the hydraulic circuit.

Still another object of this invention is to provide a fluid power steering system for a truck vehicle of the off-the-road type having at least one steerable driving axle which comprises two outer axle housings steeringly connected to the inner axle housing and further includes a tie rod coordinating the steering movements of the outer axle housings. A hydraulic circuit including a control circuit and a working circuit is operatively connected to the steerable driving axle wherein the working circuit provides primary and secondary sources of fluid under pressure such that depending upon the rate of steering movement one or both sources of fluid under pressure is utilized to steer the steerable driving axle. Double-acting actuators comprising a part of the working circuit are utilized to power steer the steerable driving axle and further to limit the steering movement of the steerable driving axle in either direction. The control circuit selectively operable by the operator is further connected to the control valve of the working circuit and to a sensing means of the steerable driving axle such that selective operation of the control circuit operates the control valve to an operating position to direct fluid under pressure to the actuators for steering movement of the steerable driving axle and the sensing means responsive to the steering movement indicates the degree of steering movement to the hydraulic circuit. Finally, load valve means in the working circuit are interposed between the control valve and the actuators to provide a predetermined resistance to external forces in the steering system and thereby to prevent steering wander or shimmying or excessive impacts on the steering system construction.

Other objects and features of this invention will be apparent upon a perusal of the following specification and drawings of which:

FIG. 1 is a front elevational view of a truck vehicle of the off-the-road type utilizing the fluid power steering system;

FIG. 2 is an enlarged partial top plan view of the front steerable driving axle;

FIG. 3 is a top plan view on a smaller scale of the front steerable driving axle, and a schematic view of the hydraulic steering circuit connected thereto;

FIG. 4 is an enlarged partial front elevational and partial cross-sectional view of one of the steering connections of the front steerable driving axle; and FIG. 5 is an enlarged top plan view of one of the steering connections of the front steerable axle.

The present embodiment is the preferred embodiment, but it is to be understood that changes can be made in the present embodiment by one skilled in the art without departing from the spirit or scope of the present invention.

For a general description of the present invention continued reference is made to the drawings. An off-the-road type truck vehicle as shown in FIG. 1 comprises an operator's compartment positioned over and at the forward end of a chassis member with a dump body positioned over the remaining portion of the chassis member. A front and rear axle assembly are supported and suspended below the chassis member such that the front axle assembly is positioned at the forward end of the dump body adjacent the rearward portion of the operator's compartment; and the rear axle assembly is positioned at the rearward end of the chassis member and the dump body. The front axle assembly is the steerable driving axle and includes two outer axle housings steeringly connected to an inner axle housing at the opposite ends thereof. Double-acting actuators are pivotally connected at their ends to the steerable axle to provide power steering of the outer axle housings and further, a tie rod is pivotally connected at its ends to the outer axle housings to coordinate the steering movements of the outer axle housings. Even though the tie rod coordinates the steering movement of the outer axle housings in the same direction, the degree of steering movement for each outer axle housing is unequal. The steerable driving axle mechanism providing the unequal steering movement is often mentioned in the art as the Ackermann steering mechanism. A hydraulic circuit includes a working circuit portion and a control circuit portion wherein the working circuit portion comprises primary and secondary sources of fluid under pressure operatively connected to the double-acting actuators with a control valve and load valve means disposed therebetween.

The control circuit provides a selectively operable manual means and is fluid operatively connected to the control valve and to a sensing means or servo-pump pivotally connected to the steerable driving axle. A movable valve member within the control valve, normally biased to the neutral position, is selectively operable by the control circuit to more than one operating position depending upon the rate of steering movement or the steering direction indicated by the operation of the selectively operable manual means within the control circuit. If the rate of steering movement is sufficiently high an unloading valve means within the control valve automatically combines the source of fluid under pressure from the secondary source with the primary source to provide the additional volume of pressure fluid necessary to steer the steerable driving axle at the increased rate. Irrespective of the rate of steering movement a servopump or sensing means positioned eccentrically relative to the steering axis of one of the steering connections of the steerable driving axle is operated upon steering movement to actuate the movable valve member of the control valve to the neutral position. Another purpose of the servo-pump is to provide "road feel" within the control circuit for the operator of the selectively operable manual means.

The load valve means interposed between the control valve and actuators permit steering movement at a predetermined fluid pressure value and assure steering in any one selected direction below the predetermined value.

Further, the load valve means include pressure valve means operatively responsive to a fluid pressure at the predetermined value to thereby provide a predetermined resistance to external forces in the steering system when the valve member is in the neutral position to prevent steering wander or shimmying or excessive impacts on the construction of the steering system.

In order to prevent excessive pressures within the hydraulic circuitry of the steering system a relief valve means is provided within the control valve to relieve pressure of pressure fluid from the primary or secondary source. To limit the steering movement in either direction of the steerable driving axle one corresponding end of each double-acting actuator provides a stop or limiting surface for one direction of steering movement. Although the fluid power steering system has been illustrated in its preferred embodiment in connection with an off-the-road type vehicle, it is to be understood that the fluid power steering system could equally be applicable to other axle arrangements such as a non-driving axle or the equivalent thereof.

The control circuit is maintained at a predetermined static pressure value for maintaining positive fluid response to movements of the manually operable means of the control circuit. The control circuit is further fluid connected to the control valve of the working circuit such that a biased check valve within the control valve acts upon pressure fluid supplying the control circuit to assure maintenance of the control circuit static pressure at the predetermined value.

Turning now to FIG. 1, a detailed description of the subject invention will now be set forth. An off-the-road type truck vehicle 10 comprises an operator's compartment 11 and a dump body 12 respectively supported above a chassis member 13 at the forward and rearward ends thereof. Beneath the chassis member 13 front and rear driving axle assemblies 14 and 20 are supported and suspended such that the front axle assembly 14 is positioned at the forward end of the dump body 12 and at the rearward end of the operator's compartment 11. The front axle assembly 14 is the steerable driving axle and is suspended and supported below the chassis member 13 by a pair of spaced-apart leaf spring assemblies 15 and a pair of shock absorbers 17. To maintain the longitudinal position of the front axle assembly 14 relative to the chassis member 13 a series of locating rods 16, two of which are shown, are pivotally connected at their ends to the chassis member 13 and the front axle assembly 14. At the outermost ends of the front axle assembly 14 pneumatic tires 18 are secured thereto completely shown in FIG. 3. The rear axle driving assembly 20 is not a steerable axle but includes pneumatic tires 18 and further is suspended, supported and located in a similar manner relative to the chassis member 13 such as the front steerable driving axle assembly 14. Although the suspension of the front and rear driving axle assemblies 14 and 20, as aforedescribed, are believed not to be necessary for the subject invention, the aforedescription is believed to be sufficient to best understand the subject invention.

Referring now to FIGS. 2 through 4, the front steerable driving axle assembly 14 comprises two outer steerable axle housings 22 pivotally or steeringly connected to the inner driving axle housing 21 at the opposite ends thereof. The pivotal connection of the outer steerable axle housing 22 and the inner axle housing 21 determines a steering axis 23 best shown in FIG. 4. A pair of trunnion members 25 include a cap portion seated and secured by bolt means to a flat surface of the outer steerable driving axle housing 22. A projection or shaft portion of the trunnion member 25 is fitted to a spherical bearing 26 having inner and outer races firmly seated within a bored opening in the inner axle housing member 21. The trunnion member 25 and spherical bearing 26 cooperate to provide the pivotal connection of the axle housings 21 and 22 along the steering axis 23. A driving shaft 27 extending out of the inner axle housing 21 is operatively connected to the outer driving axle 28 by a constant velocity universal joint 30 lying also on the steering axis 23. Although for purposes of brevity only one steering connection is shown in detail in FIG. 4, it is to be understood that the other steering pivotal connection at the other end of the inner axle housing 21 and the other outer steerable driving axle housing 22 are identical in detail. A tie rod 24 of conventional construction is pivotally connected at its ends to the two outer steerable axle housings 22 to coordinate their steering movement.

As best shown in FIGS. 2 to 3, a pair of double-acting actuators 31 pivotally connected to the front steerable driving axle assembly 14 provide fluid power steering movement thereof. Specifically, the actuators 31 are identical and provide a fluid cylinder 34 and an extending rod 33 of a piston rod assembly at one end thereof. A trunnion member 34 of conventional construction having a cylindrical portion is secured in a suitable manner such as welding rigidly at the head end of the cylinder 31. Further, the trunnion member 34 includes a pair of diametrically opposed cylindrical projection members providing a bearing surface for pivotal securement to the inner axle housing 21 having an integrally shaped semi-circular recess support portion 36 therein and an assembling cap portion 35 having a corresponding semi-circular recess portion. Both recesses of the cap portion 35 and the support portion 36 have a diametrical size corresponding substantially to the bearing surface of the projection portion of the trunnion member 34 for a bearing fit. The outer axle housing 22 opposite the tie rod pivotal connection thereto further includes another projection portion 38 integrally shaped thereto and having a spherical recess 37 therein for engagement with an enlarged spherical portion at one end of the rod 33. Thus as the actuators 31 are selectively actuated by hydraulic fluid under pressure from a hydraulic circuit 39, to be subsequently described, the outer axle housings 22 are steered relative to the inner axle housing 21 about their steering axes 23 through the pivotal connection of the actuators 31 provided by the trunnion 34 at the head end of the cylinders 32, and by the spherical recess 37 at the outer end of the rod 33.

The hydraulic circuit 39, best shown in FIG. 3, supplies hydraulic fluid under pressure to the actuators 31 for power steering of the steerable driving axle assembly 14 through a working circuit and a control circuit. Considering firstly the working circuit, which comprises a control valve 40 consisting of a central body portion 41, intermediate cap portions 41a and outermost cap portions 41b, primary and secondary pump sources 42 and 43, a reservoir 44 and two load valve means 45 disposed between the control valve 40 and the actuators 31. A suction conduit 46 connected at one end to the reservoir 44 delivers fluid from the reservoir 44 to the primary and secondary pumps 42 and 43 through a parallel connection at the other end of the suction conduit 46. Then a supply conduit 47 delivers fluid under pressure from the primary pump 42 to the primary inlet port 48 in the control valve 40. Similarly supply conduit 53 connected at one end to the secondary pump delivers fluid under pressure therefrom to the secondary inlet port 54 of the control valve 40. Fluid from the control valve 40 is returned to the reservoir 44 through a discharge port 50 connected to a return conduit 51 also connected in parallel at the other end to the discharge ports of the load valve means 45. Intermediate the ends of the return conduit 51 a conduit 52 is directly connected to the reservoir 44.

A movable valve member or plunger 55 is provided within the control valve 40 and comprises a series of annular lands 56, 57, 58, 60 and 61 interconnected by a series of reduced portions or annular recesses 62, 63, 64 and 65. It is to be noted here that the annular land 60 is of greater length than any annular land on the valve member 55 and that the outermost lands 56 and 61 are identical and the other two annular lands 57 and 58 are also identical but the smallest in length. The outermost ends 66 of the valve member 55 provide a pair of identical closed end bores 67 for the assembly therein of a centering spring 68 and a pin means 70. The pin means includes an enlarged or piston-head end at one end and a threaded end for an engaging nut at the other end to engage a surface of the intermediate portion 41a adjacent the cap portion 41b, to be later further described. The two centering springs 68 and pin means 70 cooperate to urge the valve member 55 to a neutral position such as shown in FIG. 3.

A bored opening through the body portion 41 of the control valve is provided for the operation of the valve member 55 and comprises a series of annular lands 72, 73, 74, 75, 76, 77, 78 and 80 interconnected by a series of annular recesses 81, 82, 83, 84, 85, 86 and 87. It is to be noted here that the annular recesses 81, 83, 85 and 87 extend beyond the bore 71 to connect with passageways or ports within the valve body portion 41 to be later described. Further extension of the bore 71 is provided within the two intermediate valve body portions 41a through annular recesses 90 and 91 interconnected by an annular land 88 engaging the outermost ends 66 of the valve member 55. It is to be noted that the annular recess 90 within the intermediate body portion 41a provides extension of the outermost annular lands 72 and 80 within the central valve body portion 41 of the bore opening 71. The outermost portions 41b of the control valve 40 provide a chamber 92 that forms part of the servo-motor of the control circuit such that the chamber 92 is connected at one end to an inlet port 93 and through a series of openings 94 at the other end is communicatively connected to the annular recess 91 and closed end bore 67 of the movable valve member 55. A passageway 95 connected at one end to the annular recess 91 and at the other end closed by a plug not indicated is for the purpose of bleeding the pressure fluid within the control circuit to remove the presence of air or other gaseous fluids. To prevent fluid pressure buildup, due to leakage, between the valve member outermost annular lands 56 and 61 within the two annular recesses 90 extending the bored opening 71 into the intermediate portions 41a an internal relief passageway 59 within the valve member 55 is provided communicatively connected at either end to the annular recesses 90 of the bored opening 71. Intermediate the ends of the internal passageway 59 a radial passageway 59a is provided within the valve member 55 at the annular recess adjacent the discharge passage 85 to equalize the fluid pressures within the annular recess 90 so as to prevent hydraulic locking of the valve member 55. The size of the internal relief passage 59 and 59a can be adjusted to provide a throttling effect on fluid flowing from recesses 90 thereby giving a cushioning or dashpot action to prevent flutter of valve member 55.

A discharge passageway 96 within the central valve portion 41 communicatively connects with the annular recesses 81 and 85 of the bored opening 71 and also communicatively connects with the passageway defined by the extension of the annular recess 87 connected at one end to a discharge port through a normally closed check valve 99. The spring biased check valve 99 is of conventional construction such that pressure fluid within the passageway 96 does not communicatively connect to the discharge port 50 unless a sufficient pressure fluid acts upon the check valve 99 to exceed the predetermined spring value. One of the purposes of the check valve 99 is to maintain a predetermined pressure on the sources of fluid under pressure in the passageway 96 to thereby maintain a predetermined static fluid pressure in the control circuit. The passageway 96 at one end is connected to the control circuit to be later described. A sufficient spring value of the check valve 99 to provide sufficient control circuit static fluid pressure for one reduction to practice corresponds to a fluid pressure of 30 p.s.i.

A first outlet port or passageway 97 connected at one end to the annular recess 82 is connected at the other end to a conduit 100 connected to the first load valve means 45. Similarly, a second outlet port or passageway 98 connected at one end to the annular recess 84 is connected at the other end to a conduit 101 connected to the second load valve means 45. Then the first load valve means 45 through a conduit 102 is parallel connected to opposite ends of the actuators 31 such that if pressure fluid under pressure appears in conduit 102 the wheels 18 in FIG. 3 will be steered to the right. Similarly, the second load valve means 45 through a conduit 103 is parallel connected to the remaining opposite ends of the actuators 31 such that if pressure fluid under pressure appears in the conduit 103 the wheels 18 will be steered to the left. It is to be noted here in FIG. 3 that the wheels 18 are positioned in the straight forward position and that the steerable driving axle 14 is moving in the forward direction as indicated by the arrow.

Since both load valve means 45 are of identical internal construction and further for the purpose of brevity, only the second load valve means 45 has been indicated by reference numbers referring to the internal details inclusively. Specifically, a main body portion 106 of the load valve means 45 provides a closed end bore therein having bore surfaces 111 and 115 interconnected by an annular recess 112 and an annular land 114. One end of the bore surface 111 not connected to the annular recess 112 is closed by a cap portion 107 having a bore 109 closed at one end and connected at the other end to an annular surface 113 of the cap portion 107. A spring biased valve member or plunger 116 is slidable within the closed bore defined by the portions 106 and 107, and includes reduced portions 117 and 118 interconnected by an annular land 120. Further, during slidable movement of the valve member 116 the reduced portion 118 slidingly engages the closed end bore 109 and the other reduced portion 117 slidingly engages the annular land 114 of the main portion 106 while the annular land 120 of the valve plunger 116 slidingly engages the bore surface 111. A spring 121 engages at one end the closed end of the bore 109 and at the other end engages the closed end of a smaller bore within the valve plunger 116 so as to urge the valve plunger 116 to a closed position against the shoulder interconnecting bore surface 115 and an outlet passageway 122 connected to the conduit 103. To prevent hydraulic locking of the valve plunger 116 within the load valve means 45 a bleed passageway of conventional construction is provided at the closed end of the bore within the valve plunger 116 communicately connecting the outlet passageway 122 and the two bores assembling the spring 121. Similarly, the first load valve means 45 has its valve plunger 116 in the spring biased closed position against the shoulder interconnecting the bore surface 115 and passageway 122 connected to the conduit 102. Although not shown in the drawings, the two load valve means 45 could be secured to the actuators 31 as one suitable design location.

Pressure fluid under pressure in either first or second outlet conduits 100 and 101 are communicately connected respectively to the conduits 102 and 103 when pressure fluid of a sufficient pressure appears in the annular recess 112 of both load valve means to urge the spring biased valve plunger 116 to an open position. To provide pressure fluid of sufficient pressure within the annular recess 112 a conduit 108 is connected at one end to the primary supply conduit 47 and parallel connected at the other end to the annular recesses 112 within both load valve means 45. Thus when pressure fluid of sufficient pressure appears in conduit 108 the load valve means 116 are opened to open position to communicatively connect respectively conduits 100 and 102, and conduits 101 and 103. In one reduction to practice a spring 121 having a predetermined value corresponding to the fluid pressure range of 275 to 400 p.s.i. was found to be suitable for operation of the load valve means 45. The purpose of the load valve means 45 is to provide a predetermined resistance to external forces in the neutral position of the valve member 55 to prevent steering wander or shimmying of the steerable driving axle 14 or excessive impacts on the construction of the hydraulic circuit 39 and the steerable driving axle 14. Another purpose of the load valve means 45 is to assure steering of the steerable driving axle 14 in any one selected direction, such as the straight forward direction shown in FIG. 3.

In view of the aforedescribed description of the working circuit components of the hydraulic circuit 39 an operation of these components together will now be described below. With the valve member 55 of the control valve in the center or neutral position as shown in FIG. 3 pressure fluid from the primary pump 42 is directed through conduit 47, annular recess 83 including its extended passageway to the bore 71, then communicatively connected to both first and second outlet ports 97 and 98, then to discharge passageway 96 through the bore annular recess 81 and 85 to the closed check valve 99. During the neutral position of the valve member 55 the fluid pressure under pressure in conduit 108 is not sufficient to open the valve plunger 116 in both load valve means 45, but the pressure fluid under pressure in the discharge passageway 96 is sufficient to open the normally closed check valve 99 so as to communicatively connect the discharge passageway 96 with the reservoir 44 through the discharge port 50 and connecting conduits 51 and 52. During the neutral position of the valve plunger of the valve member 55 the secondary source of pressure fluid from pump 43 is communicatively connected to the reservoir 44 through conduit 53, inlet port 54 and annular recess 86 including its extended passageway to annular recess 87 through annular land 78 to the discharge port 50 and conduits 51 and 52. Thus during the neutral position of the valve member 55 the primary pump 42 is communicatively connected through the valve member 55 to the discharge passageway 96, then to the reservoir 44 through the check valve 99, and the secondary fluid pressure pump 43 is communicatively connected to the reservoir 44 through the inlet port 54 to the discharge port 50 through passageways 86 and 87.

If the valve member 55 is moved by the control circuit to the left, the first right steering position, valve member lands 57 and 58 respectively engage bore lands 73 and 75 to direct pressure fluid from the primary pump 42 through passageway 83 to annular recess 82 to communicatively connect with the first load valve means 45 through first outlet port 97 and conduit 100. While the second load valve means 45 through conduit 101 is communicatively connected to the reservoir 44 through annular recess 84 communicatively connected to annular recess 85 to connect with discharge passageway 96, check valve 99 and conduits 51 and 52. It is to be noted here that the longitudinal length of valve member land 60 while the valve member 55 is in the first right steering position is not sufficient to prevent communicative connection between bore annular recesses 84 and 85.

Assuming that the valve member 55 has returned to the neutral position and the rate of steering movement has sufficiently increased as indicated by the control circuit the valve member 55 is moved further to the left to the second right steering position such that valve member annular lands 57, 58, 60 and 61 respectively engage bore annular lands 73, 75, 77 and 78. In the second left position of the valve member 55 for right steering movement of the steerable driving axle 14 pressure fluid under pressure from the primary pump 42 and the secondary pump 43 are combined in the passageway 83 to communicatively connect with the first load valve means 45 through conduit 100, first outlet port 97 and communicatively connected bore annular recesses 82 and 83. During the second left position of the valve member 55 the second load valve means 45 is communicatively connected to the reservoir 44 through conduit 101, second port 98, communicatively connected annular recesses 84 and 85 to conduits 51 and 52 through discharge passageway 96 and check valve 99. Also during the second left position of the valve member 55 annular land 61 engaging annular land 78 prevents communication between passageway 86 and 87 such that the secondary source of pressure fluid under pressure now has sufficient pressure in passageway 127 to unseat an unloading valve 123 to combine the flow with the primary pump 42 in passageway 83.

Although not heretofore mentioned in detail, the unloading valve 123 comprises a valve member 124 slidable in a bore 126 closed at one end by the left intermediate body portion 41a. It is to be noted here that the passageway 127 is of less diameter than the closed end bore 126. The valve member 124 provides a closed end bore for assembly of a coil spring 125 engaging at its opposite ends the bore 126 and the valve member bore. To prevent hydraulic locking of the unloading valve 124 and supply pressure from the passageway 83 for differential area operation a passageway 128 is provided. As shown in FIGURE 3 the unloading valve is in the normally closed position engaging the beveled seat portion 130 between passageways 83 and 127. Thus whenever passageway 86 is prevented from connecting with passageway 87 by movement of the valve member 55, the secondary pressure fluid under pressure in passageway 86 is sufficient to open the unloading valve 124 and thereby combine the pressure fluid of the primary and secondary pumps 42 and 43.

While the valve member 55 is in a first or second left position for right steering movement of the steerable driving axle 14 pressure fluid under pressure in conduit 108 in parallel connection to both load valve means develops sufficient pressure within load valve annular recesses 112 to urge the spring biased valve plungers 116 to the open position to thereby communicatively connect respectively conduits 100 and 102 and conduits 101 and 103. Since pressure fluid under pressure appears in conduit 100 the actuators 31 cause movement of the outer steering axle housings 22 about their steering axes 23 for steering movement to the right, namely, the clockwise direction as viewed in FIGURE 3. Simultaneously with movement of the actuators 31 fluid in conduit 103 is returned to the reservoir 44 through conduits 101, communicatively connected recesses 84 and 85, discharge passageway 96, check valve 99, discharge port 50 and connected conduits 51 and 52 to the reservoir 44. Upon return movement of the valve member 55 to the neutral position from the first or second left position for right steering movement both load valve means 45 will be urged to the closed position by spring biased valve member 116 since in the neutral position there is not sufficient pressure of the pressure fluid in conduit 108 to urge the spring biased valve members 116 to the open position for communicatively connecting conduits 100 and 102, and 101 and 103.

If the valve member 55 from the neutral position shown in FIGURE 3 is moved to the right, the first left steering position, by the control circuit such that the valve member lands 82 and 84 engage respectively bore lands 74 and 76 while annular land 60 is not of sufficient length in the first right position to engage bore annular land 78 so as to prevent communication between passageways 86 and 87. In the first right position pressure fluid under pressure from the primary pump 42 is directed to the second load valve means 45 and conduit 101 through passageway 83 communicatively connected annular recess 84 to second outlet port 98. The first load valve means 45 and its conduit 100 are directly connected to the reservoir 44 in the first right position of the valve member 55 through first port 97, communicatively connected recesses 81 and 82, discharge pasageway 96, check valve 99, discharge port 50 and connected conduits 51 and 52.

Assuming that the valve member is further moved from the neutral position 55 shown in FIGURE 3 to the right to the second left steering position by the control circuit indicating an increased rate of steering movement, the passageway 83 remains communicatively connected to the second load valve means 45 and conduit 101 through communicatively connected recess 84 and second port 98. Further, the first load valve means 45 and its conduit 100 remains directly connected to the reservoir 44 through communicatively connected recesses 81 and 82, discharge passageway 96, check valve 99, discharge port 50 and connected conduits 51 and 52. However, during the second right position valve member land 60 engages bore annular land 78 while still engaging bore annular land 77 to prevent communicative connection with passageways 86 and 87 to thereby increase the pressure of the secondary pressure fluid under pressure in passageways 86 and 87 sufficiently to open the unloading valve 123 to combine the flow of the primary and secondary pumps 42 and 43 to thereby increase the rate of steering movement of the steerable driving axle 14.

While the valve member 55 is in a first or second right position for left steering movement of the steerable driving axle 14 pressure fluid under pressure in conduit 108 in parallel connection to both load valve means 45 develops sufficient pressure within load valve annular recesses 112 to urge the valve members 116 to the open position to thereby communicatively connect respectively conduits 101 and 103, 100 and 102. It is to be pointed out, however, that in either the first or second right position pressure fluid under pressure appears in conduit 103 to now move the actuators 31 in the opposite direction to steer the outer driving axle housings about their steering axis 23 to the left, namely, the clockwise direction as viewed in FIGURE 3. As should now be readily apparent return pressure fluid from the actuators 31 is directed through conduit 102 to the reservoir 44 through conduit 100 and communicatively connected recesses 81 and 82.

In order to prevent excessive pressures within the hydraulic circuit 39 a relief valve means 131 is provided. Specifically, the relief valve means 131 comprises a valve plunger 132 slidable in a closed bore 134 and urged to a closed position by a coiled spring 133 engaging at its ends the closed end of bore 134 and of the valve plunger bore. In the closed position an inclined surface 138 on the valve plunger 132 engages an annular shoulder 137 between passageway 135 and 83 to prevent fluid communication therebetween. A bleed passageway 136 connects passageway 135 with the closed end bore 134, the purpose of which is to prevent hydraulic locking of the relief valve plunger 131. Whenever an excessive pressure occurs in the passageway 83 irrespective of combined flow of the primary and secondary pumps 42 and 43 or just the flow of the primary pump 42 the relief valve plunger 131 is moved to open position against its spring 133 to communicatively connect passageways 83 and 135 so that the relieved pressure fluid is directed to the reservoir 44 through passageway 87, discharge port 50 to connected conduits 51 and 52. It is to be further noted that the passageway 135 is of smaller diameter than the closed end bore 134.

In view of the aforedescribed description of the working circuit of the hydraulic circuit 39 a description of the control circuit thereof will now be set forth. The control circuit comprises a steering wheel 141 on a steering shaft 142 operatively connected to a steering pump 143 of conventional construction. The steering pump 143 includes conduits 144 and 145 connected to the passageways 93 on the outermost body portions 41b of the control valve 40. It is to be pointed out here that the control circuit is normally static and that movement of the steering wheel 141 by the operator within the operator's cab 11 displaces fluid in conduits 144 and 145. In the event that excessive pressure occurs in one of the conduits 144 and 145 an opposed check valve 146 comprising two check valve means as shown in FIGURE 3 is connected across conduits 144 and 145 by a conduit 147 to relieve the excessive pressure that may occur in conduits 144 and 145. The control circuit is maintained under a predetermined static pressure since the check valve 99 as aforedescribed maintains a predetermined pressure for the pressure fluid in the discharge passageway 96. The pressure fluid in passageway 96 is connected to the control circuit portion through conduits 151 and 152. A pressure fluid operated check valve 150 is also connected across conduits 144 and 145 by conduit 148. Further, the check valve 150 is also connected to the central body portion 41 of the control valve 40 to the discharge passageway 96 by conduits 151 and 152. Thus if any drop off in pressure fluid occurs in the control circuit the pressure fluid operated check valve 150 is urged to the opened position by the pressure fluid in conduits 151 and 152 to increase pressure fluid in the control circuit to the normal supply and normal static pressure. To assure that supplied pressure fluid in conduit 151 is free of any foreign elements a filter 153 of conventional construction is provided and interposed between conduits 151 and 152.

In order to move the valve plunger 55 from the neutral position to the first or second left position, the operator moves the steering wheel 141 in one direction to cause movement of pressure fluid from conduit 144 to conduit 145 to thereby move pressure fluid into the right servomotor chamber 92 communicatively connected to annular recess 91 through passageways 94 as aforedescribed. Then the moved pressure fluid acts upon the outermost right end of the valve member 55 in FIGURE 3 to move it to the left. Simultaneously with movement of the valve member 55 to the left the left pin means 70 in the left servo-motor 92 in FIGURE 3 is moved to the left against the action of the centering spring 68.

When the operator moves the steering wheel 141 in the opposite direction pressure fluid in conduit 145 is moved by pump 143 to conduit 144 and the left servo-motor chamber 92 communicatively connected to the annular recess 91 by passageway 94. Assuming that the valve member 55 is in a neutral position the moved pressure fluid acting upon the left outermost annular end of the valve member 55 moves the valve member 55 to the first or second right position. During this rightward movement of the valve member 55 the right pin means 70 is moved to the right against the action of its centering spring 68.

It should now be noted that when the left or right servomotor chambers 92 are actuated by movement of the pressure fluid in the static control circuit there is sufficient spacing allowed in the servo-motor chambers 92 for movement of the pin means 70 against the action of the centering spring 68. Further, the adjustment of the nut on the threaded end of the pin means 70 provides the proper centering and corresponding neutral position of the valve member 55 in the control valve 40.

The control circuit in combination with the servomotors 92 and steering pump 143 further provides a servopump or sensing means 154 secured to the steerable driving axle 14. As best shown in FIGURES 4 and 5 the servo-pump 154 comprises a cylinder 155 having a piston therein with longitudinal rods projecting from opposed surfaces of the piston 156. The piston and rods within the cylinder 155 are movable in opposite directions along the longitudinal axis 157. One end 166 of the longitudinal rods is pivotally connected on an axis 158 to an upwardly extending bracket 164 which is secured through bolt fastening means 165, one being indicated, to the outer driving axle housing 22. The upwardly extending bracket 164 includes a somewhat U-shaped recess 167 providing pivotal connection of the enlarged end 166 on the axis 158 through an engaging pin means 168. One end of the cylinder 155 provides a pivotal connection on an axis 160 to two diametrically opposed trunnion members projecting outwardly and rigidly secured to the cylinder 155 in a suitable manner to bearingly engage laterally extending spaced-apart arms on an upwardly extending bifurcated bracket 161 having a support portion 162 secured to the inner axle housing 21 by a series of bolt fastener means 163, one being indicated in FIG. 5. It is to be noted here that the purpose of the two longitudinal rods projecting from opposite surfaces of the piston 156 is to define equal fluid areas on the opposite sides of the piston 156 and therefore equal fluid volume for equal travel of piston 156. Fluid conduits 170 and 171 connected to opposite ends of the servo-pump cylinder 155 are connected respectively to conduits 144 and 145 at their ends adjacent the connection to the servo-motor chambers 92.

The type of steerable driving axle 14 shown in FIG. 3 is such that it includes two outer steerable driving axle housings 22 connected to an inner axle housing 21 about steering axes 23 and further coordinates the steering movement of the outer steerable axle housings 22 by the pivotally connected tie rod 24 is often referred to as the Ackermann steering arrangement. The geometrical relationship of the Ackermann steering arrangement is such that in FIG. 3 if the steering movement is to the left or counterclockwise movement the lower pair of wheels 18 in FIG. 3 will turn at a greater angle or degree of steering movement than the upper pair of wheels 18 relative to a general reference line and correspondingly if the steerable driving axle 14 is steered to the right or clockwise movement of the two pairs of wheels 18 the upper pair of wheels will turn at a greater angle or degree of steering movement in FIG. 3 than the lower pair of wheels therein to the general reference line. In view of this unequal steering movement of either outer axle housing 22 about its steering axis 23 in opposite steering directions the servo-pump 154 has to be positioned eccentrically relative to the steering axis 23 as shown in FIG. 5 to provide equal displacement of pressure fluid within the servo-pump 154 for each direction of steering movement about the steering axis 23. Thus as can be readily seen in FIG. 5 when the wheels 18 are in the straight forward position the axis of the pivotal connection 158 lies along an axis 159 passing through the steering axis 23. Upon movement of the steerable driving axle 14 to be steered to the left by action of the control circuit by the operator, the axis 158 of the pivotal connection is moved to the right, shown in dotted lines in FIG. 5. Upon movement of the steerable driving axle 14 to be moved to the right by action of the control circuit by the operator in the opposite direction, the axis 158 of the pivotal connection is moved to the other position shown in dotted lines in FIG. 5 to indicate the right steering movement of the steerable driving axle 14. Although it is readily apparent in FIG. 5 that the angular degree of steering movement of the outer axle housing 22 from straight forward steering movement to left steering movement is of greater angular degree than steering movement from the straight forward to the right steering movement, the eccentric position of the pivotal connections of the servo-pump 154 about the axes 158 and 160 relative to the steering axis 23 assures equal longitudinal displacement of the piston 156 along its longitudinal axis 157 in opposite directions when steering from left to right or vice versa. In one reduction to practice to provide equal displacement in opposite directions of the servo-pump piston 156 with the steerable driving axle 14 in the straight forward position movement of the axis 158, 24½ degrees to the left for right steering movement was found to be suitable; and similarly movement of the axis 158 to the right 32 degrees for maximum left steering movement was found to be suitable with the axis 158 displaced 7½ degrees off the steering axis 23 in the straight forward steering position.

Since the purpose of the servo-pump 154 is to provide "road feel" within the control circuit so that when the operator moves the steering wheel 141 in one direction to move the valve member 55 to the left for right steering movement of the steerable driving axle 14 the servo-pump rod connected to axis 158 will be retracted as shown in FIG. 5 for right steering movement and displaced pressure fluid in conduit 170 connected to the left servo-motor 92 to oppose actuation of the valve member 55 to the left position and thereby provide "road feel" to the operator in moving the steering wheel 141. Similarly, when the operator moves the steering wheel 141 in the other direction pressure fluid in conduit 144 is moved to actuate the valve member 55 to the right. Upon rightward movement of the valve member 55 the steerable driving axle 14 will be moved for leftward steering movement resulting in extension of the servo-pump rod connected to the axis 158 thereby displacing pressure fluid in conduit 171 to actuate the right servo-motor 92 to oppose the rightward movement of the valve member 55 and thus again provide "road feel" for the operator moving the steering wheel 141 in the other direction. Thus for left or right steering movement of the steerable driving axle 14 the servo-pump 154 is actuated to actuate one of the servo-motors 92 to oppose respectively the rightward or leftward movement of the valve member 55 to urge the valve member 55 to the neutral position.

It should be understood that the volumetric displacement of the servo-pump 154 and the two servo-motors 92 must be selected appropriately with that of the steering displacement pump 143 so that for each degree the steering wheel 141 is rotated it will produce a corresponding angular displacement of the outer steerable axle housing 22 about the steering axis 23 with respect to the inner axle housing 21 of the steerable driving axle 14. Although only one steering connection which includes the only servo-pump 154 has been illustrated, it should be readily apparent that the greater degree of steering movement of the other steering connection in FIGURE 3 of the other outer steerable driving axle housing 22 occurs for right steering movement.

To prevent over-steering of the steerable driving axle 14 when steering either to the left or to the right a mechanical stop to limit the steering movement has been provided at one end of the actuators 31. As shown in FIG. 2 by the fragmentary view the head end of the cylinder provides an abutting surface 172 to limit the movement of the rod end 173 and piston 174. Thus in FIG. 2 if the wheel 18 is steered to the right the rightward movement is limited by the abutting engagement of the surface 172 with the rod end 173. Similarly the other actuator 31, identical details not shown, provides a surface at the head end of the cylinder 31 for limiting the rod end of the rod 33 in leftward steering movement of the wheels 18. Thus the surface 172 of the head end of each actuator 31 limits the steering movement in one direction to prevent over-steering and possible damage to the steerable driving axle 14 or vehicle chassis 13.

In view of the aforedescribed description of the details of the present invention a brief summary of the operation of the fluid power steering system will now be set forth below. Assuming that the steerable driving axle 14 is in the straight forward steering position the valve member 55 of the control valve 40 is in the neutral postion such that pressure fluid from the primary pump 42 is directed through the bore 71 to the reservoir 44 through the fluid pressure opened check valve 99. With the valve member 55 in the neutral position the pressure fluid under pressure in conduit 108 is not sufficient to open spring biased valve member 116 in the load valve means to communicatively connect respectively conduits 100 and 102, and 101 and 103.

If the operator moves the steering wheel 141 at a normal rate of steering movement in one direction the valve member 55 will be moved to the first left position connecting the primary pump 42 to the first load valve means 45 communicatively connecting conduits 100 and 102 to the actuators 31 for right power steering movement of the steerable driving axle 14. If the operator further increases the rate of steering movement of the steering wheel 141 the valve member 55 is moved to the second left position so as to communicatively connect the secondary pump 43 in combined flow with the primary pump 42 through the opened unloading valve 123. While the valve member 55 is in a first or second left position the second load valve means 45 communicatively connects conduits 103 and 101 directly to the reservoir 44 through the annular recesses 84 and 85 to the discharge passageway 96 and discharge port 50 for the return fluid from the actuators 31.

Assuming that the valve member 55 has returned again to the neutral position as shown in FIG. 3 and further that the operator moves the steering wheel at a normal steering rate in the other direction the valve member 55 is moved to the right by the left servo-motor 92 to communicatively connect the primary pump 42 with the second load valve means 45 and thereby communicatively connect conduits 101 and 103 with pressure fluid under pressure to actuate the actuators 31 in the other direction to steeringly move the steerable driving axle 14 in the leftward direction about the steering axis 23. If the operator increases the rate of steering movement of the steering wheel 141 the valve member 55 is moved to the second rightward position to thereby combine the flow of the secondary and primary pumps 43 and 42 through the opened unloading valve 123 to communicatively connect conduits 101 and 103 through the opened second unloading valve 45 to steer the steerable driving axle 14 at the increased rate to the left. It should now be readily apparent that when the valve member 55 is moved to the right the first load valve means 45 communicatively connecting conduits 100 and 102 for their flow of return pressure fluid from the actuators to be returned directly to the reservoir 44 through the communicatively connected annular recesses 81 and 82.

When the operator is maintaining a selected steering direction, such as the forward steering direction in FIG. 3 thereby not moving the steering wheel 141, and the wheels 18 strike an obstruction the normally closed load valve means 45 are not opened to communicatively connect conduits 100 and 102, and 101 and 103. Assuming that a sufficient obstruction strikes the wheels 18 to open the load valve means 45 against their biasing springs 121, the servo-pump 154 would immediately respond to the obstructive steering movement left or right of the outer steering axle housings 22 and correspondingly move the control valve member 55 in the same manner left or right to correct for the obstructive steering movement. Thus the servo-pump 154 further functions to provide corrective action or "road feel" for the operator whenever an obstruction occurs to open the closed load valve means 45.

Finally as aforementioned, a surface at the head end of each actuator provides a limiting stop in one direction of steering movement by the outer steerable driving axle 22 to prevent oversteering thereby. Further, during any operation of the hydraulic circuit 39, the check valve 99 assures a predetermined static fluid pressure to be maintained in the control circuit portion through the fluid operated check valve 150 connected to conduits 151 and 152.

Having thus described an embodiment of the invention, it can now be seen that the objects of the invention have been fully achieved and it must be understood that changes and modifications may be made which do not depart from the spirit of the invention nor the scope thereof as defined in the appended claims.

What is claimed is:

1. A fluid power steering system for a steerable axle on a vehicle,
   (a) said axle comprising an inner axle housing and a pair of steerable outer axle housings,
   (b) said inner axle housing including opposed ends defining steering axes such that said steerable outer axle housings are each pivotally connected to one of said ends about one of said steering axes,
   (c) a hydraulic working circuit and a hydraulic control circuit,
   (d) said working circuit having a source of fluid under pressure and including fluid return means,
   (e) a control valve in said working circuit having an inlet port communicatively connected to said source of fluid under pressure,
   (f) a double acting actuator pivotally connected at its ends to said outer housings and said inner housing for controlled steering movement therebetween,
   (g) a first fluid outlet port in said control valve communicatively connected to one end of said actuator,
   (h) a second fluid outlet port in said control valve communicatively connected to the other end of said actuator,
   (i) a discharge port disposed in said control valve,
   (j) a movable valve member disposed in said control valve, said member being movable from a neutral position to a forward position for communicatively connecting said source of fluid under pressure with said actuator for steering movement in one direction,
   (k) said member being movable from said neutral position to a reverse position for communicatively connecting said source of fluid under pressure with said actuator for steering movement in another direction,
   (l) said control valve being adapted to connect communicatively said source of fluid under pressure with said discharge port and said actuator when the valve member in said control valve is in neutral position,
   (m) a servo-motor connected to actuate said movable member of said control valve,
   (n) said control circuit having manually operable means for moving fluid in at least one direction in said control circuit,
   (o) said servo-motor being operatively responsive to movement of fluid in said control circuit for actuating said movable member of said control valve,
   (p) a servo-pump operable in opposite directions and being pivotally connected at one of its ends to said inner axle housing and at the other of its ends to one of said outer steerable axle housings,
   (q) the pivotal connections of said servo-pump being positioned relative to said steering axis such that steering movement in the opposite directions of said outer axle housing results in equal displacement of pressure fluid from said servo-pump,
   (r) means for communicatively connecting said pump to said control circuit, said pump being operatively responsive to steering movement so that pressure fluid in said control circuit is moved in a direction to actuate said servo-motor for returning said movable member of said control valve from an operating position to a neutral position,
   (s) said actuator including means to mechanically limit the degree of steering movement.

2. A fluid power steering system for a steerable axle on a vehicle,
   (a) said axle comprising an inner axle housing and a pair of steerable outer axle housings,
   (b) said inner axle housing including opposed ends defining steering axes such that said steerable outer axle housings are each pivotally connected to one of said ends about one of said steering axes, (c) a hydraulic working circuit and a hydraulic control circuit, (d) said working circuit having a source of fluid under pressure and including fluid return means, (e) a control valve in said working circuit having an inlet port communicatively connected to said source of fluid under pressure, (f) a double acting actuator pivotally connected at its ends to said outer housings and said inner housing for controlled steering movement therebetween, (g) a first fluid outlet port in said control valve communicatively connected to one end of said actuator, (h) a second fluid outlet port in said control valve communicatively connected to the other end of said actuator, (i) a discharge port disposed in said control valve, (j) a movable valve member disposed in said control valve, said member being movable from a neutral position to a forward position for communicatively connecting said source of fluid under pressure with said actuator for steering movement in one direction, (k) said member being movable from said neutral position to a reverse position for communicatively connecting said source of fluid under pressure with said actuator for steering movement in another direction, (l) said control valve being adapted to connect communicatively said source of fluid under pressure with said discharge port and said actuator when the valve member in said control valve is in neutral position, (m) a servo-motor connected to actuate said movable member of said control valve, (n) said control circuit having manually operable means for moving fluid in at least one direction in said control circuit, (o) said servo-motor being operatively responsive to movement of fluid in said control circuit for actuating said movable member of said control valve, (p) a servo-pump operable in opposite directions and being pivotally connected at one of its ends to said inner axle housing and at the other of its ends to one of said outer steerable axle housings, (q) the pivotal connections of said servo-pump being positioned relative to said steering axis such that steering movement in the opposite directions of said outer axle housing results in equal displacement of pressure fluid from said servo-pump, (r) means for communicatively connecting said pump to said control circuit, said pump being operatively responsive to steering movement so that pressure fluid in said control circuit is moved in a direction to actuate said servo-motor for returning said movable member of said control valve from an operating position to a neutral position.

3. A fluid power steering system for a steerable axle on a vehicle, (a) said axle comprising an inner axle housing and a steerable outer axle housing, (b) said inner axle housing including at least one end defining a steering axis such that said steerable outer axle housing is pivotally connected to said end of said steering axis, (c) a hydraulic working circuit and a hydraulic control circuit, (d) said working circuit having a source of fluid under pressure and including fluid return means, (e) a control valve in said working circuit having an inlet port communicatively connected to said source of fluid under pressure, (f) a double acting actuator pivotally connected at its ends to said outer housing and said inner housing for controlled steering movement therebetween, (g) a first fluid outlet port in said control valve communicatively connected to one end of said actuator, (h) a second fluid outlet port in said control valve communicatively connected to the other end of said actuator, (i) a discharge port disposed in said control valve, (j) a movable valve member disposed in said control valve, said member being movable from a neutral position to a forward position for communicatively connecting said source of fluid under pressure with said actuator for steering movement in one direction, (k) said member being movable from said neutral position to a reverse position for communicatively connecting said source of fluid under pressure with said actuator for steering movement in another direction, (l) said control valve being adapted to connect communicatively said source of fluid under pressure with said discharge port and said actuator when the valve member in said control valve is in neutral position, (m) a servo-motor connected to actuate said movable member of said control valve, (n) said control circuit having manually operable means for moving fluid in at least one direction in said control circuit, (o) said servo-motor being operatively responsive to movement of fluid in said control circuit for actuating said movable member of said control valve, (p) a servo-pump operable in opposite directions and being pivotally connected at one of its ends to said inner axle housing and at the other of its ends to said outer steerable axle housing, (q) the pivotal connections of said servo-pump being positioned relative to said steering axis such that steering movement in the opposite directions of said outer axle housing results in equal displacement of pressure fluid from said servo-pump, (r) means for communicatively connecting said pump to said control circuit, said pump being operatively responsive to steering movement so that pressure fluid in said control circuit is moved in a direction to actuate said servo-motor for returning said movable member of said control valve from an operating position to a neutral position.

4. A fluid power steering system for a steerable axle on a vehicle, (a) said axle comprising an inner axle housing and a pair of steerable outer axle housings, (b) said inner axle housing including opposed ends defining steering axes such that said steerable outer axle housings are each pivotally connected to one of said inner axle ends about one of said steering axes, (c) a tie rod pivotally connected at its ends to said pair of steerable outer axle housings for coordination of steering movement, (d) a hydraulic working circuit and a hydraulic control circuit, (e) said working circuit having a source of fluid under pressure including fluid return means, (f) said working circuit further including relief valve means to relieve excessive fluid pressure therein, (g) a control valve in said working circuit having an inlet port communicatively connected to said source of fluid under pressure, (h) a pair of double acting actuators each pivotally connected at its ends to one of said outer housings and said inner housing for controlled steering movement therebetween, (i) a first fluid outlet port in said control valve communicatively connected to opposite ends of said actuators, (j) a second fluid outlet port in said control valve communicatively connected to the other opposite ends of said actuators, (k) a discharge port disposed in said control valve, (l) a check valve having its inlet side communicatively connected with said discharge port and its outlet side communicatively connected to said fluid return means, said check valve further communicatively connected to said control circuit, (m) said check valve serving to bypass fluid from said discharge port to said fluid return means when the fluid pressure in said discharge port exceeds a predetermined value, said check valve further serving to maintain the pressure fluid of said control circuit at the predetermined value, (n) a movable valve member disposed in said control valve, said member being movable from a neutral position to a forward position for communicatively connecting said source of fluid under pressure with said actuators for steering movement in one direction, (o) said member being movable from said neutral position to a reverse position for communicatively connecting said source of fluid under pressure with said actuators for steering movement in another direction, (p) said control valve being adapted to connect communicatively said source of fluid under pressure with said discharge port and said actuators when the valve member in said control valve is in neutral position, (q) a servo-motor connected to actuate said movable member of said control valve, (r) said control circuit having manually operable means for moving fluid in at least one direction in said control circuit, (s) said servo-motor being operatively responsive to movement of fluid in said control circuit for actuating said movable member of said control valve, (t) a servo-pump operable in opposite directions and being pivotally connected at one of its ends to said inner axle housing and at the other of its ends to one of said outer steerable axle housings, (u) the pivotal connections of said servo-pump being eccentrically positioned relative to said steering axis such that unequal steering movement in the opposite directions of said outer axle housings results in equal displacement of pressure fluid from said servo-pump, (v) means for communicatively connecting said pump to said control circuit, said pump being operatively responsive to steering movement so that pressure fluid in said control circuit is moved in a direction to actuate said servo-motor for returning said movable member of said control valve from an operating position to a neutral position.

5. A fluid power steering system for a steerable axles on a vehicle, (a) said axle comprising an inner axle housing and a pair of steerable outer axle housings, (b) said inner axle housing including opposed ends defining steering axes such that said steerable outer axle housings are each pivotally connected to one of said inner axle ends about one of said steering axes, (c) a tie rod pivotally connected at its ends to said pair of steerable outer axle housings for coordination of steering movement, (d) a hydraulic working circuit and a hydraulic control circuit, (e) said working circuit having a source of fluid under pressure including fluid return means, (f) a control valve in said working circuit having an inlet port communicatively connected to said source of fluid under pressure, (g) a pair of double acting actuators each pivotally connected at its ends to one of said outer housings and said inner housing for controlled steering movement therebetween, (h) a first fluid outlet port in said control valve communicatively connected to opposite ends of said actuators.

(i) a second fluid outlet port in said control valve communicatively connected to the other opposite ends of said actuators, (j) a discharge port disposed in said control valve, (k) a check valve having its inlet side communicatively connected with said discharge port and its outlet side communicatively connected to said fluid return means, said check valve further communicatively connected to said control circuit, (l) said check valve serving to bypass fluid from said discharge port to said fluid return means when the fluid pressure in said discharge port exceeds a predetermined value, said check valve further serving to maintain the pressure fluid of said control circuit at the predetermined value, (m) a movable valve member disposed in said control valve, said member being movable from a neutral position to a forward position for communicatively connecting said source of fluid under presusre with said actuators for steering movement in one direction.

(n) said member being movable from said neutral position to a reverse position for communicatively connecting said source of fluid under pressure with said actuators for steering movement in another direction, (o) said control valve being adapted to connect communicatively said source of fluid under pressure with said discharge port and said actuators when the valve member in said control valve is in neutral position, (p) a servo-motor connected to actuate said movable member of said control valve, (q) said control circuit having manually operable means for moving fluid in at least one direction in said control circuit, (r) said servo-motor being operatively responsive to movement of fluid in said control circuit for actuating said movable member of said control valve, (s) a servo-pump operable in opposite directions and being pivotally connected at one of its ends to said inner axle housing and at the other of its ends to one of said outer steerable axle housings, (t) the pivotal connections of said servo-pump being eccentrically positioned relative to said steering axis such that unequal steering movement in the opposite directions of said outer axle housings results in equal displacement of pressure fluid from said servo-pump, (u) means for communicatively connecting said pump to said control circuit, said pump being operatively responsive to steering movement so that pressure fluid in said control circuit is moved in a direction to actuate said servo-motor for returning said movable member of said control valve from an operating to a neutral position.

6. A fluid power steering system for a steerable axle on a vehicle, (a) said axle comprising an inner axle housing and a pair of steerable outer axle housings, (b) said inner axle housing including opposed ends defining steering axes such that said steerable outer axle housings are each pivotally connected to one of said inner axle ends about one of said steering axes, (c) a tie rod pivotally connected at its ends to said pair of steerable outer axle housings for coordination of steering movement, (d) a hydraulic working circuit and a hydraulic control circuit, (e) said working circuit having a source of fluid under pressure including fluid return means, (f) a control valve in said working circuit having an inlet port communicatively connected to said source of fluid under pressure, (g) a pair of double acting actuators each pivotally connected at its ends to one of said outer housings and said inner housing for controlled steering movement therebetween, (h) a first fluid outlet port in said control valve communicatively connected to opposite ends of said actuators,
(i) a second fluid outlet port in said control valve communicatively connected to the other opposite ends of said actuators,
(j) a discharge port disposed in said control valve,
(k) a check valve having its inlet side communicatively connected with said discharge port and its outlet side communicatively connected to said fluid return means, said check valve further communicatively connected to said control circuit,
(l) said check valve serving to bypass fluid from said discharge port to said fluid return means when the fluid pressure in said discharge port exceeds a predetermined value, said check valve further serving to maintain the pressure fluid of said control circuit at the predetermined value,
(m) a movable valve member disposed in said control valve, said member being movable from a neutral position to a forward position for communicatively connecting said source of fluid under pressure with said actuators for steering movement in one direction,
(n) said member being movable from said neutral position to a reverse position for communicatively connecting said source of fluid under pressure with said actuators for steering movement in another direction,
(o) valve means including pressure responsive means communicatively connected between said outlet ports and said actuator to limit steering of said steerable driving axle to fluid pressure of another predetermined value,
(p) said control valve being adapted to connect communicatively said source of fluid under pressure with said discharge port and said valve means when the valve member in said control valve is in neutral position,
(q) a servo-motor connected to actuate said movable member of said control valve,
(r) said control circuit having manually operable means for moving fluid in at least one direction in said control circuit,
(s) said servo-motor being operatively responsive to movement of fluid in said control circuit for actuating said movable member of said control valve to an operating position,
(t) a servo-pump operable in opposite directions and being pivotally connected at one of its ends to said inner axle housing and at the other of its ends to one of said outer steerable axle housings,
(u) the pivotal connections of said servo-pump being eccentrically positioned relative to said steering axis such that unequal steering movement in the opposite directions of said outer axle housings results in equal displacement of pressure fluid from said servo-pump,
(v) means for communicatively connecting said pump to said control circuit, said pump being operatively responsive to steering movement so that pressure fluid in said control circuit is moved in a direction to actuate said servo-motor for returning said movable member of said control valve from an operating position to a neutral position.

7. A fluid power steering system for a sterable axle on a vehicle,
(a) said axle comprising an inner axle housing and a pair of steerable outer axle housings,
(b) said inner axle housing including opposed ends defining steering axes such that said steerable outer axle housings are each pivotally connected to one of said inner axle ends about one of said steering axes,
(c) a tie rod pivotally connected at its ends to said pair of steerable outer axle housings for coordination of steering movement,
(d) a hydraulic working circuit and a hydraulic control circuit,
(e) said working circuit having a source of fluid under pressure including fluid return means,
(f) a control valve in said working circuit having an inlet port communicatively connected to said source of fluid under pressure,
(g) a pair of double acting actuators each pivotally connected at its ends to one of said outer housings and said inner housing for controlled steering movement therebetween.
(h) a first fluid outlet port in said control valve communicatively connected to opposite ends of said actuators,
(i) a second fluid outlet port in said control valve communicatively connected to the other opposite ends of said actuators,
(j) a discharge port disposed in said control valve,
(k) a check valve having its inlet side communicatively connected with said discharge port and its outlet side communicatively connected to said fluid return means, said check valve further communicatively connected to said control circuit,
(l) said check valve serving to bypass fluid from said discharge port to said fluid return means when the fluid pressure in said discharge port exceeds a predetermined value, said check valve further serving to maintain the pressure fluid of said control circuit at the predetermined value,
(m) a movable valve member disposed in said control valve, said member being movable from a neutral position to a forward position for communicatively connecting said source of fluid under pressure with said actuators for steering movement in one direction,
(n) said member being movable from said neutral position to a reverse position for communicatively connecting said source of fluid under pressure with said actuators for steering movement in another direction,
(o) valve means including pressure responsive means communicatively connected between said outlet ports and said actuators to limit steering movement of said steerable driving axle to fluid pressure of another predetermined value,
(p) said control valve being adapted to connect communicatively said source of fluid under pressure with said discharge port and said valve means when the valve member in said control valve is in neutral position,
(q) a servo-motor connected to actuate said movable member of said control valve,
(r) said control circuit having manually operable means for moving fluid in at least one direction in said control circuit,
(s) said servo-motor being operatively responsive to movement of fluid in said control circuit for actuating said movable member of said control valve,
(t) a servo-pump operable in opposite directions and being pivotally connected at one of its ends to said inner axle housing and at the other of its ends to one of said outer steerable axle housings,
(u) the pivotal connections of said servo-pump being eccentrically positioned relative to said steering axis such that unequal steering movement in the opposite directions of said outer axle housings results in equal displacement of pressure fluid from said servo-pump,
(v) means for communicatively connecting said pump to said control circuit, said pump being operatively responsive to steering movement so that pressure fluid in said control circuit is moved in a direction to actuate said servo-motor for returning said movable member of said control valve from an operating position to a neutral position,
(w) and said actuators including means at corresponding ends thereof to mechanically limit the degree of steering movement in each direction.

8. A fluid power steering system for a steerable axle on a vehicle,
 (a) said axle comprising an inner axle housing and a steerable outer axle housing,
 (b) said inner axle housing including at least one end defining a steering axis such that said steerable outer axle housing is pivotally connected to said end about said steering axis,
 (c) a hydraulic working circuit and a hydraulic control circuit,
 (d) said working circuit having a primary source of fluid under pressure and a secondary source of fluid under pressure, said working circuit including fluid return means,
 (e) a control valve in said working circuit having a primary inlet port communicatively connected to said primary source of fluid under pressure and a secondary inlet port communicatively connected to said secondary source of fluid under pressure,
 (f) a double acting actuator pivotally connected at its ends to said outer housing and said inner housing for controlled steering movement therebetween,
 (g) a first fluid outlet port in said control valve communicatively connected to one end of said actuator,
 (h) a second fluid outlet port in said control valve communicatively connected to the other end of said actuator,
 (i) a discharge port disposed in said control valve,
 (j) a movable valve member disposed in said control valve, said member being movable from a neutral position to a first forward position for communicatively connecting said primary source of fluid under pressure with said actuator for steering movement in one direction,
 (k) said member being movable from said first forward position to a second forward position connecting said primary and secondary sources of fluid under pressure with said actuator for steering movement in said one direction,
 (l) said member being movable from said neutral position to a first reverse position for communicatively connecting said primary source of fluid under pressure with said actuator for steering movement in another direction,
 (m) said member being movable from said first reverse position to a second reverse position for communicatively connecting said primary and secondary sources of fluid under pressure with said actuator for steering movement in said another direction,
 (n) said control valve being adapted to connect communicatively said sources of fluid under pressure with said discharge port and said actuator when the valve member in said control valve is in neutral position,
 (o) said control circuit including means for pressure fluid movement in at least one direction,
 (p) said control circuit comprising other means operably responsive to the fluid movement to actuate said movable member to an operating position for steering movement,
 (q) said control circuit comprising further means positioned relative to said steering axis and operably responsive to steering movement to actuate said movable member from the operating position to the neutral position.

9. A fluid power steering system for a steerable axle on a vehicle,
 (a) said axle comprising an inner axle housing and a pair of steerable outer axle housings,
 (b) said inner axle housing including opposed ends defining steering axes such that said steerable outer axle housings are each pivotally connected to one of said ends about one of said steering axes,
 (c) a hydraulic working circuit and a hydraulic control circuit,
 (d) said working circuit having a primary source of fluid under pressure and a secondary source of fluid under pressure, said working circuit including fluid return means,
 (e) a control valve in said working circuit having a primary inlet port communicatively connected to said primary source of fluid under pressure and a secondary inlet port communicatively connected to said secondary source of fluid under pressure,
 (f) a double acting actuator pivotally connected at its ends to said outer housings and said inner housing for controlled steering movement therebetween,
 (g) a first fluid outlet port in said control valve communicatively connected to one end of said actuator,
 (h) a second fluid outlet port in said control valve communicatively connected to the other end of said actuator,
 (i) a discharge port disposed in said control valve,
 (j) a movable valve member disposed in said control valve, said member being movable from a neutral position to a first forward position for communicatively connecting said primary source of fluid under pressure with said actuator for steering movement in one direction,
 (k) said member being movable from said first forward position to a second forward position connecting said primary and secondary sources of fluid under pressure with said actuators for steering movement in said one direction,
 (l) said member being movable from said neutral position to a first reverse position for communicatively connecting said primary source of fluid under pressure with said actuator for steering movement in another direction,
 (m) said member being movable from said first reverse position to a second reverse position for communicatively connecting said primary and secondary sources of fluid under pressure with said actuator for steering movement in said another direction,
 (n) said control valve being adapted to connect communicatively said sources of fluid under pressure with said discharge port and said actuator when the valve member in said control valve is in neutral position,
 (o) a servo-motor connected to actuate said movable member of said control valve,
 (p) said control circuit having manually operable means for moving fluid in at least one direction in said control circuit,
 (q) said servo-motor being operatively responsive to movement of fluid in said control circuit for actuating said movable member of said control valve,
 (r) a servo-pump operable in opposite directions and being pivotally connected at one of its ends to said inner axle housing and to one of said outer steerable axle housings,
 (s) the pivotal connections of said servo-pump being positioned relative to one of said steering axes such that steering movement in the opposite directions of said outer axle housings results in equal displacement of pressure fluid from said servo-pump,
 (t) means for communicatively connecting said pump to said control circuit, said pump being operatively responsive to steering movement so that pressure fluid in said control circuit is moved in a direction to actuate said servo-motor for returning said movable member of said control valve from an operating position to a neutral position,
 (u) said actuator including means to mechanically limit the degree of steering movement.

10. A fluid power steering system for a steerable axle on a vehicle,
 (a) said axle comprising an inner axle housing and a pair of steerable outer axle housings,
 (b) said inner axle housing including opposed ends defining steering axes such that said steerable outer axle housings are each pivotally connected to one of said ends about one of said steering axes, (c) a hydraulic working circuit and a hydraulic control circuit,
(d) said working circuit having a primary source of fluid under pressure and a secondary source of fluid under pressure, said working circuit including fluid return means,
(e) a control valve in said working circuit having a primary inlet port communicatively connected to said primary source of fluid under pressure and a secondary inlet port communicatively connected to said secondary source of fluid under pressure,
(f) a double acting actuator pivotally connected at its ends to said outer housings and said inner housing for controlled steering movement therebetween,
(g) a first fluid outlet port in said control valve communicatively connected to one end of said actuator,
(h) a second fluid outlet port in said control valve communicatively connected to the other end of said actuator,
(i) a discharge port disposed in said control valve,
(j) a movable valve member disposed in said control valve, said member being movable from a neutral position to a first forward position for communicatively connecting said primary source of fluid under pressure with said actuator for steering movement in other direction,
(k) said member being movable from said first forward position to a second forward position connecting said primary and secondary sources of fluid under pressure with said actuators for steering movement in said one direction,
(l) said member being movable from said neutral position to a first reverse position for communicatively connecting said primary source of fluid under pressure with said actuator for steering movement in another direction,
(m) said member being movable from said first reverse position to a second reverse position for communicatively connecting said primary and secondary sources of fluid under pressure with said actuator for steering movement in said another direction,
(n) said control valve being adapted to connect communicatively said sources of fluid under pressure with said discharge port and said actuator when the valve member in said control valve is in neutral position,
(o) a servo-motor connected to actuate said movable member of said control valve,
(p) said control circuit having manually operable means for moving fluid in at least one direction in said control circuit,
(q) said servo-motor being operatively responsive to movement of fluid in said control circuit for actuating said movable member of said control valve,
(r) a servo-pump operable in opposite directions and being pivotally connected at one of its ends to said inner axle housing and to one of said outer steerable axle housings,
(s) the pivotal connections of said servo-pump being positioned relative to one of said steering axes such that steering movement in the opposite directions of said outer axle housings results in equal displacement of pressure fluid from said servo-pump.
(t) means for communicatively connecting said pump to said control circuit, said pump being operatively responsive to steering movement so that pressure fluid in said control circuit is moved in a direction to actuate said servo-motor for returning said movable member of said control valve from an operating position to a neutral position.

11. A fluid power steering system for a steerable axle on a vehicle,
(a) said axle comprising an inner axle housing and a steerable outer axle housing,
(b) said inner axle housing including at least one end defining a steering axis such that said steerable outer axle housing is pivotally connected to said end about said steering axis,
(c) a hydraulic working circuit and a hydraulic control circuit,
(d) said working circuit having a primary source of fluid under pressure and a secondary source of fluid under pressure, said working circuit including fluid return means,
(e) a control valve in said working circuit having a primary inlet port communicatively connected to said primary source of fluid under pressure and a secondary inlet port communicatively connected to said secondary source of fluid under pressure,
(f) a double acting actuator pivotally connected at its ends to said outer housing and said inner housing for controlled steering movement therebetween.
(g) a first fluid outlet port in said control valve communicatively connected to one end of said actuator.
(h) a second fluid outlet port in said control valve communicatively connected to the other end of said actuator.
(i) a discharge port disposed in said control valve,
(j) a movable valve member disposed in said control valve, said member being movable from a neutral position to a first forward position for communicatively connecting said primary source of fluid under pressure with said actuator for steering movement in one direction,
(k) said member being movable from said first forward position to a second forward position connecting said primary and secondary sources of fluid under pressure with said actuator for steering movement in said one direction.
(l) said member being movable from said neutral position to a first reverse position for communicatively connecting said primary source of fluid under pressure with said actuator for steering movement in another direction,
(m) said member being movable from said first reverse position to a second reverse position for communicatively connecting said primary and secondary sources of fluid under pressure with said actuator for steering movement in said another direction,
(n) said control valve being adapted to connect communicatively said sources of fluid under pressure with said discharge port and said actuator when the valve member in said control valve is in neutral position,
(o) a servo-motor connected to actuate said movable member of said control valve,
(p) said control circuit having manually operable means for moving fluid in at least one direction in said control circuit,
(q) said servo-motor being operatively responsive to movement of fluid in said control circuit for actuating said movable member of said control valve,
(r) a servo-pump operable in opposite directions and being pivotally connected at one of its ends to said inner axle housing and said outer steerable axle housing,
(s) the pivotal connections of said servo-pump being positioned relative to said steering axis such that steering movement in the opposite directions of said outer axle housing results in equal displacement of pressure fluid from said servo-pump.
(t) means for communicatively connecting said pump to said control circuit, said pump being operatively responsive to steering movement so that pressure fluid in said control circuit is moved in a direction to actuate said servo-motor for returning said movable member of said control valve from an operating position to a neutral position.

12. A fluid power steering system for a steerable axle on a vehicle,
(a) said axle comprising an inner axle housing and a pair of steerable outer axle housings, (b) said inner axle housing including opposed ends defining steering axes such that said steerable outer axle housings are each pivotally connected to one of said ends about one of said steering axes, (c) a tie rod pivotally connected at its ends to said pair of steerable outer axle housings for coordination of steering movement in opposite directions, (d) a hydraulic working circuit and a hydraulic control circuit, (e) said working circuit having a primary source of fluid under pressure and a secondary source of fluid under pressure, said working circuit including fluid return means, (e) said working circuit further including relief valve means to relieve excessive fluid pressures therein, (f) a control valve in said working circuit having a primary inlet port communicatively connected to said primary source of fluid under pressure and a secondary inlet port communicatively connected to said secondary source of fluid under pressure, (g) a pair of double acting actuators each pivotally connected at its ends to one of said outer housings and said inner housing for controlled steering movement therebetween, (h) a first fluid outlet port in said control valve communicatively connected to opposite ends of said actuators, (i) a second fluid outlet port in said control valve communicatively connected to the other opposite ends of said actuators, (j) a discharge port disposed in said control valve, (k) a check valve having its inlet side communicatively connected with said discharge port and its outlet side communicatively connected to said fluid return means, said check valve further communicatively connected to said control circuit.

(l) said check valve serving to bypass fluid from said discharge port to said fluid return means when the fluid pressure in said discharge port exceeds a predetermined value, said check valve further serving to maintain the pressure fluid of said control circuit at the predetermined value, said check valve further serving to maintain the pressure fluid of said control circuit at the predetermined value, (m) a movable valve member disposed in said control valve, said member being movable from a neutral position to a first forward position for communicatively connecting said primary source of fluid under pressure with said actuators for steering movement in one direction, (n) said member being movable from said first forward position to a second forward position connecting said primary and secondary sources of fluid under pressure with said actuators for steering movement in said one direction, (o) said member being movable from said neutral position to a first reverse position for communicatively connecting said primary source of fluid under pressure with said actuators for steering movement in another direction, (p) said member being movable from said first reverse position to a second reverse position for communicatively connecting said primary and secondary sources of fluid under pressure with said actuators for steering movement in said another direction, (q) said control valve being adapted to connect communicatively said sources of fluid under pressure with said discharge port and at least one of said sources with said actuators when the valve member in said control valve is in neutral position, (r) a servo-motor connected to actuate said movable member of said control valve, (s) said control circuit having manually operable means for moving fluid in at least one direction in said control circuit, (t) said servo-motor being operatively responsive to movement of fluid in said control circuit for actuating said movable member from a neutral position to an operating position of said control valve, (u) a servo-pump operable alternatively in opposite directions and being pivotally connected at one end of its ends to said inner axle housing and at the other of its ends to one of said outer steerable axle housings, (v) the pivotal connections of said servo-pump being eccentrically positioned relative to said steering axis such that unequal steering movement in the opposite directions of said outer axle housings results in equal displacement of pressure fluid from said servo-pump, (w) means for communicatively connecting said pump to said control circuit, said pump being operatively responsive to steering movement so that pressure fluid in said control circuit is moved in a direction to actuate said servo-motor for returning said movable member of said control valve from an operating position to a neutral position.

13. A fluid power steering system for a steerable axle on a vehicle, (a) said axle comprising an inner axle housing and a pair of steerable outer axle housings, (b) said inner axle housing including opposed ends defining steering axes such that said steerable outer axle housings are each pivotally connected to one of said ends about one of said steering axes, (c) a tie rod pivotally connected at its ends to said pair of steerable outer axle housings for coordination of steering movement in opposite directions, (d) a hydraulic working circuit and a hydraulic control circuit, (e) said working circuit having a primary source of fluid under pressure and a secondary source of fluid under pressure, said working circuit including fluid return means, (f) a control valve in said working circuit having a primary inlet port communicatively connected to said primary source of fluid under pressure and a secondary inlet port communicatively connected to said secondary source of fluid under pressure, (g) a pair of double acting actuators each pivotally connected at its ends to one of said outer housings and said inner housing for controlled steering movement therebetween, (h) a first fluid outlet port in said control valve communicatively connected to opposite ends of said actuators, (i) a second fluid outlet port in said control valve communicatively connected to the other opposite ends of said actuators, (j) a discharge port disposed in said control valve, (k) a check valve having its inlet side communicatively connected with said discharge port and its outlet side communicatively connected to said fluid return means, said check valve further communicatively connected to said control circuit, (l) said check valve serving to bypass fluid from said discharge port to said fluid return means when the fluid pressure in said discharge port exceeds a predetermined value, said check valve further serving to maintain the pressure fluid of said control circuit at the predetermined value, (m) a movable valve member disposed in said control valve, said member being movable from a neutral position to a first forward position for communicatively connecting said primary source of fluid under pressure with said actuators for steering movement in one direction, (n) said member being movable from said first forward position to a second forward position connecting said primary and secondary sources of fluid under pressure with said actuators for steering movement in said one direction,
(o) said member being movable from said neutral position to a first reverse position for communicatively connecting said primary source of fluid under pressure with said actuators for steering movement in another direction,
(p) said member being movable from said first reverse position to a second reverse position for communicatively connecting said primary and secondary sources of fluid under pressure with said actuators for steering movement in said another direction,
(q) said control valve being adapted to connect communicatively said sources of fluid under pressure with said discharge port and at least one of said sources with said actuators when the valve member in said control valve is in a neutral position,
(r) a servo-motor connected to actuate said movable member of said control valve,
(s) said control circuit having manually operable means for moving fluid in at least one direction in said control circuit,
(t) said servo-motor being operatively responsive to movement of fluid in said control circuit for actuating said movable member from the neutral position to an operating position of said control valve,
(u) a servo-pump operable in opposite directions and being pivotally connected at one of its ends to said inner axle housing and at the other of its ends to one of said outer steerable axle housings,
(v) the pivotal connections of said servo-pump being eccentrically positioned relative to said steering axis such that unequal steering movement in the opposite directions of said outer axle housings results in equal displacement of pressure fluid from said servo-pump,
(w) means for communicatively connecting said pump to said control circuit, said pump being operatively responsive to steering movement so that pressure fluid in said control circuit is moved in a direction to actuate said servo-motor for returning said movable member of said control valve from an operating position to a neutral position.

14. A fluid power steering system for a steerable axle on a vehicle,
(a) said axle comprising an inner axle housing and a pair of steerable outer axle housings,
(b) said inner axle housing including opposed ends defining steering axes such that said steerable outer axle housings are each pivotally connected to one of said ends about one of said steering axes,
(c) a tie rod pivotally connected at its ends to said pair of steerable outer axle housings for coordination of steering movement in opposite directions,
(d) a hydraulic working circuit and a hydraulic control circuit,
(e) said working circuit having a primary source of fluid under pressure and a secondary source of fluid under pressure, said working circuit including fluid return means,
(f) a control valve in said working circuit having a primary inlet port communicatively connected to said primary source of fluid under pressure and a secondary inlet port communicatively connected to said secondary source of fluid under pressure,
(g) a pair of double acting actuators each pivotally connected at its ends to one of said outer housings and said inner housing for controlled steering movement therebetween,
(h) a first fluid outlet port in said control valve communicatively connected to opposite ends of said actuators,
(i) a second fluid outlet port in said control valve communicatively connected to the other opposite ends of said actuators,
(j) a discharge port disposed in said control valve, (k) a check valve having its inlet side communicatively connected with said discharge port and its outlet side communicatively connected to said fluid return means, said check valve further communicatively connected to said control circuit,
(l) said check valve serving to bypass fluid from said discharge port to said fluid return means when the fluid pressure in said discharge potr exceeds a predetermined value, said check valve further serving to maintain the pressure fluid of said control circuit at the predetermined value,
(m) a movable valve member disposed in said control valve, said member being movable from a neutral position to a first forward position for communicatively connecting said primary source of fluid under pressure with said actuators for steering movement in one direction,
(n) said member being movable from said first forward position to a second forward position connecting said primary and secondary sources of fluid under pressure with said actuators for steering movement in said one direction,
(o) said member being movable from said neutral position to a first reverse position for communicatively connecting said primary source of fluid under pressure with said actuators for steering movement in another direction,
(p) said member being movable from said first reverse position to a second reverse position for communicatively connecting said primary and secondary sources of fluid under pressure with said actuators for steering movement in said another direction,
(q) valve means including pressure responsive means communicatively connected between said outlet ports and said actuators to limit power steering of said steerable driving axle to fluid pressure of a predetermined value,
(r) said control valve being adapted to connect communicatively said sources of fluid under pressure with said discharge port and at least one of said sources with said valve means when the valve member in said control valve is in neutral position,
(s) a servo-motor connected to actuate said movable member of said control valve,
(t) said control circuit having manually operable means for moving fluid in at least one direction in said control circuit,
(u) said servo-motor being operatively responsive to movement of fluid in said control circuit for actuating said movable member from the netural position to on operating position of said control valve,
(v) a servo-pump operable in opposite directions and being pivotally connected at one of its ends to said inner axle housing and at the other of its ends to one of said outer steerable axle housings,
(w) the pivotal connections of said servo-pump being eccentrically positioned relative to said steering axis such that unequal steering movement in the opposite directions of said outer axle housings results in equal displacement of pressure fluid from said servo-pump,
(x) means for communicatively connecting said pump to said control circuit, said pump being operatively responsive to steering movement so that pressure fluid in said control circuit is moved in a direction to actuate said servo-motor for returning said movable member of said control valve from an operating position to a neutral position, 15. A fluid power steering system for a steerable axle on a vehicle,
(a) said axle comprising an inner axle housing and a pair of steerable outer axle housings,
(b) said inner axle housing including opposed ends defining steering axes such that said steerable outer axle housings are each pivotally connected to one of said ends about one of said steering axes, (c) a tie rod pivotally connected at its ends to said pair of steerable outer axle housings for coordination of steering movement in opposite directions, (d) a hydraulic working circuit and a hydraulic control circuit, (e) said working circuit having a primary source of fluid under pressure and a secondary source of fluid under pressure, said working circuit including fluid return means, (f) a control valve in said working circuit having a primary inlet port communicatively connected to said primary source of fluid under pressure and a secondary inlet port communicatively connected to said secondary source of fluid under pressure, (g) a pair of double acting actuators each pivotally connected at its ends to one of said outer housings and said inner housing for controlled steering movement therebetween, (h) a first fluid outlet port in said control valve communicatively connected to opposite ends of said actuators, (i) a second fluid outlet port in said control valve communicatively connected to the other opposite ends of said actuators, (j) a discharge port disposed in said control valve, (k) a check valve having its inlet side communicatively connected with said discharge port and its outlet side communicatively connected to said fluid return means, said check valve further communicatively connected to said control circuit, (l) said check valve serving to bypass fluid from said discharge port to said fluid return means when the fluid pressure in said discharge port exceeds predetermined value, said check valve further serving to maintain the pressure fluid of said control circuit at the predetermned value, (m) a movable valve member disposed in said control valve, said member being movable from a neutral position to a first forward position for communicatively connecting said primary source of fluid under pressure with said actuators for steering movement in one direction, (n) said member being movable from said first forward position to a second forward position connecting said primary and secondary sources of fluid under pressure with said actuators for steering movement in said one direction, (o) said member being movable from said neutral position to a first reverse position for communicatively connecting said primary source of fluid under pressure with said actuators for steering movement in another direction, (p) said member being movable from said first reverse position to a second reverse position for communicatively connecting said primary and secondary sources of fluid under pressure with said actuators for steering movement in said another direction, (q) valve means including pressure responsive means communicatively connected between said outlet ports and said actuators to limit power steering of said steerable driving axle to fluid pressure of a predetermined value, (r) said control valve being adapted to connect communicatively said sources of fluid under pressure with said discharge port and at least one of said sources with said valve means when the valve member in said control valve is in neutral position, (s) a servo-motor connected to actuate said movable member of said control valve, (t) said control circuit having manually operable means for moving fluid in at least one direction in said control circuit, (u) said servo-motor being operatively responsive to movement of fluid in said control circuit for actuating said movable member from the neutral position to an operating position of said control valve, (v) a servo-pump operable in opposite directions and being pivotally connected at one of its ends to said inner axle housing and at the other of its ends to one of said outer steerable axle housings, (w) the pivotal connections of said servo-pump being eccentrically positioned relative to said steering axis such that unequal steering movement in the opposite direction of said outer axle housings results in equal displacement of pressure fluid from said servo-pump, (x) means for communicatively connecting said pump to said control circuit, said pump being operatively responsive to steering movement so that pressure fluid in said control circuit is moved in a direction to actuate said servo-motor for returning said movable member of said control valve from an operating position to a neutral position, (y) and said actuators including means at corresponding ends thereof to mechanically limit the degree of steering movement in each direction.

References Cited by the Examiner

UNITED STATES PATENTS

| | | | |
|---|---|---|---|
| 2,045,524 | 6/36 | Fehrman | 180—1 |
| 2,334,918 | 11/43 | French | 180—79.2 |
| 2,424,288 | 7/47 | Severy | 180—79.2 |
| 2,748,509 | 6/56 | Brown et al. | 180—45 |
| 2,918,135 | 12/59 | Wittren | 180—79.2 |
| 2,954,756 | 10/60 | Donner et al. | 180—79.2 |

A. HARRY LEVY, *Primary Examiner.*